(12) United States Patent
Comenduli et al.

(10) Patent No.: US 10,161,465 B2
(45) Date of Patent: Dec. 25, 2018

(54) CONNECTION SYSTEM BETWEEN A BRAKING BAND AND A HAT OF A DISC FOR A DISC BRAKE

(71) Applicant: FRENI BREMBO S.p.A., Curno, Bergamo (IT)

(72) Inventors: Alberto Comenduli, Bergamo (IT); Massimiliano Maroni, Bergamo (IT)

(73) Assignee: Freni Brembo S.p.A., Curno, Bergamo (IT)

( * ) Notice: Subject to any disclaimer, the term of this patent is extended or adjusted under 35 U.S.C. 154(b) by 0 days.

(21) Appl. No.: 14/392,412

(22) PCT Filed: Dec. 17, 2014

(86) PCT No.: PCT/IB2014/067000
§ 371 (c)(1),
(2) Date: Jun. 10, 2016

(87) PCT Pub. No.: WO2015/092698
PCT Pub. Date: Jun. 25, 2015

(65) Prior Publication Data
US 2017/0030423 A1 Feb. 2, 2017

(30) Foreign Application Priority Data
Dec. 18, 2013 (IT) .............................. BS2013A0183

(51) Int. Cl.
*F16D 65/12* (2006.01)
*F16D 65/02* (2006.01)

(52) U.S. Cl.
CPC ......... *F16D 65/123* (2013.01); *F16D 65/128* (2013.01); *F16D 2065/1316* (2013.01); *F16D 2065/1348* (2013.01); *F16D 2065/1392* (2013.01); *F16D 2200/0013* (2013.01); *F16D 2200/0017* (2013.01); *F16D 2200/0026* (2013.01); *F16D 2200/0052* (2013.01)

(58) Field of Classification Search
CPC ................. F16D 65/123; F16D 65/128; F16D 2065/1316; F16D 2065/1392
USPC ....................................................... 188/218 XL
See application file for complete search history.

(56) References Cited

U.S. PATENT DOCUMENTS 3,478,849 A * 11/1969 Hahm ................. F16D 65/0006
188/218 A
4,147,240 A * 4/1979 Klein .................... F16D 65/123
188/218 XL
(Continued)

FOREIGN PATENT DOCUMENTS

DE 284954 A5 11/1990
DE 19528434 A1 2/1997
(Continued)

OTHER PUBLICATIONS

European Patent Office, Italian Search Report of IT 102013902218321 (IT BS20130183), dated Aug. 12, 2014, 2 pages, European Patent Office, Munich, Germany.
(Continued)

*Primary Examiner* — Melanie Torres Williams
(74) *Attorney, Agent, or Firm* — Marshall & Melhorn, LLC (57) ABSTRACT

A disc for a disc brake for automotive use comprises a hat provided with a plurality of hat seats, a braking band provided with a plurality of band seats, and a lug connection system.

17 Claims, 10 Drawing Sheets

(56) References Cited

U.S. PATENT DOCUMENTS

| | | | | |
|---|---|---|---|---|
| 4,848,521 A | * | 7/1989 | Izumine | F16D 65/123 |
| | | | | 188/18 A |
| 4,913,266 A | * | 4/1990 | Russell | F16D 3/78 |
| | | | | 188/18 A |
| 5,823,303 A | * | 10/1998 | Schwarz | F16D 65/123 |
| | | | | 188/218 XL |
| 2010/0051397 A1 | * | 3/2010 | Kim | F16D 65/12 |
| | | | | 188/218 XL |
| 2012/0247882 A1 | | 10/2012 | Root | |

FOREIGN PATENT DOCUMENTS

| | | | | |
|---|---|---|---|---|
| DE | 60111429 T2 | | 3/2006 | |
| EP | 0987462 A1 | * | 3/2000 | F16D 65/0006 |
| EP | 1227261 B1 | | 7/2007 | |

OTHER PUBLICATIONS

European Patent Office, International Search Report and Written Opinion of PCT/IB2014/067000, dated Mar. 15, 2015, 10 pages, European Patent Office, Rijswijk, Netherlands.

* cited by examiner

CONNECTION SYSTEM BETWEEN A BRAKING BAND AND A HAT OF A DISC FOR A DISC BRAKE

BACKGROUND OF THE INVENTION

The present invention relates to a disc for a disc brake, in particular for the automotive industry; in particular, it relates to a connection system between the hat and the braking band of the disc.

The embodiments known of today of discs for disc brakes provide for making two parts: a braking band, which the caliper of the disc brake acts on to generate the braking torque, and the hat, fixed to the wheel hub and associated with the braking band.

The connection between the band and the hat is of considerable importance, since it ensures the transfer of the braking torque from the band to the hat (and from this to the wheel hub).

Currently, the constraint in rotation between the band and the hat is achieved with systems which provide for teeth of the braking band which couple in respective seats of the hat; the axial constraint is instead achieved by stop elements capable of axially retaining the teeth in the respective seats. Such embodiments are particularly simple and inexpensive.

However, they have some drawbacks, such as a particularly onerous state of stress acting on the teeth of the band, especially in the area where the band connects with the band ring.

The object of the present invention is to provide a connection system between the hat and the braking band of a disc for a disc brake, which satisfies the aforementioned requirements and overcomes the drawbacks of the embodiments of the prior art.

Such purpose is achieved by a connection system according to claim 1. The dependent claims describe embodiment variants.

BRIEF DESCRIRTION OF THE DRAWINGS

The characteristics and advantages of the connection system according to the present invention will be evident from the description given below, by way of a non-limiting example, according to the appended drawings, wherein.

DETAILED DESCRITION OF THE INVENTION

With reference to the appended drawings, reference numeral 1 globally denotes a disc for a disc brake, primarily intended for automotive use.

Figure 1:
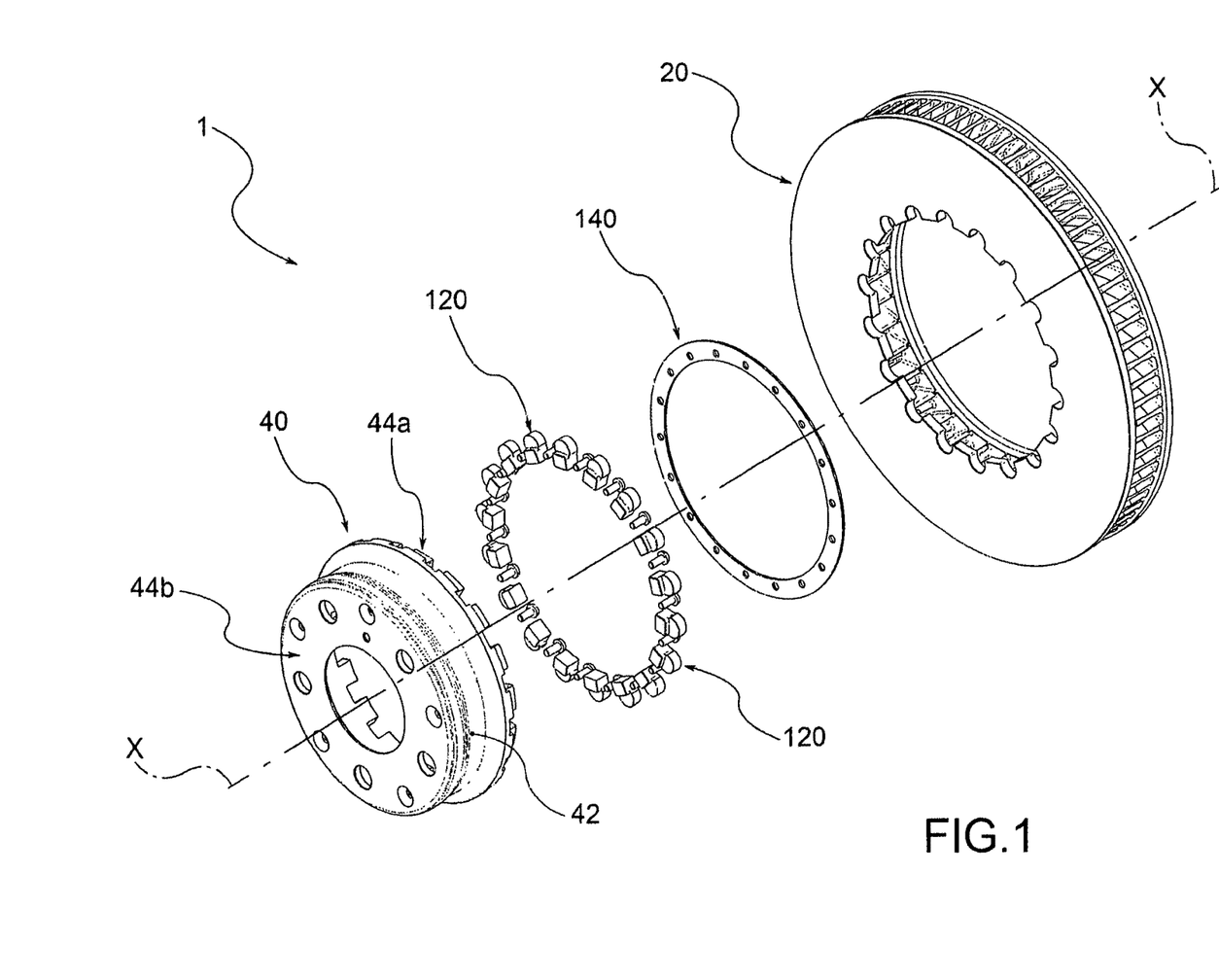
FIG. 1 shows a disc for a disc brake in separate parts, provided with a connection system according to the present invention, according to one embodiment.

The disc 1, which extends around a central axis X axial-symmetrically, comprises a braking band 20 and a hat 40, structurally separate.

Figure 6:
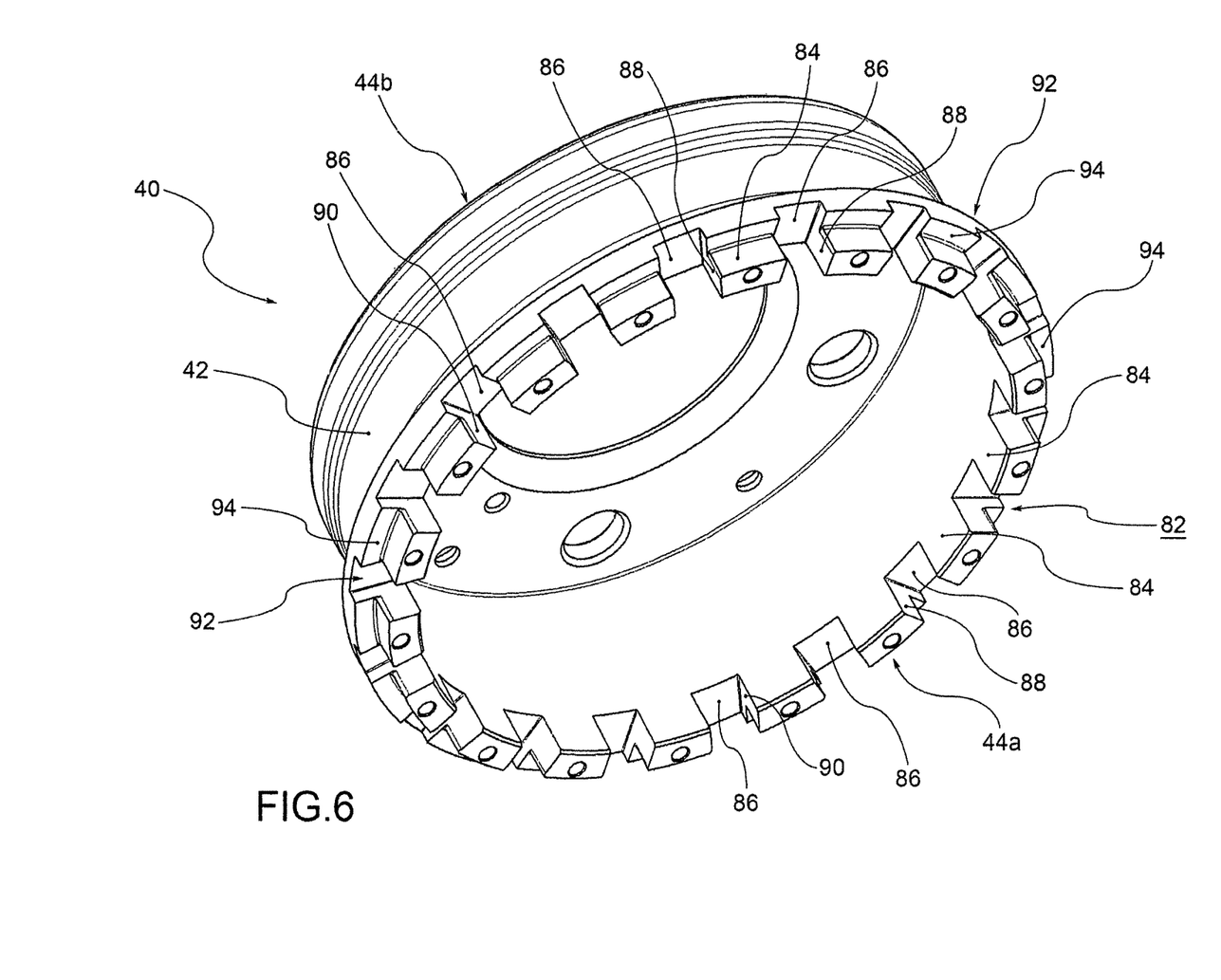
FIG. 6 shows the hat of the disc in FIG. 1.

The hat 40 comprises an annular hat wall 42, extending along the central axis X, between a connection end to the band 44a and an opposite connection end to the hub 44b.

The hat 40 is designed to be connected, at the connection end to the hub 44b, to a wheel hub, using suitable attachment means, able to make said hat and said hub integral in a detachable manner, and, at the connection end to the band 44a, to the band 20.

According to a preferred embodiment, the disc 1 is of the ventilated type.

In said embodiment, the band 20 preferably comprises a first flange and a second flange 22, 24, facing each other axially, defining between them an interspace 26, joined by pins 28 which form a plurality of inner ventilation ducts.

Each flange 22, 24 comprises a ring 22a, 24a, each delimited externally by a first braking surface 22b and a second braking surface 24b, and internally, i.e. on the side facing the interspace 26, by respective inner annular surfaces.

One of the two flanges 22, 24, or both according to an alternative embodiment, further comprises a connection crown 30, made in one piece with the relative ring 22a, placed radially inside said ring 22a and intended for the mechanical connection with the hat 40.

Preferably, the flanges 22, 24 are made in one piece, for example in cast iron, preferably of the lamellar or spheroidal type, or in carbon-ceramic material.

The band 20 is thus axially delimited overall by the first braking surface 22b of the first flange 22 and the second braking surface 24b of the second flange 24.

The braking surfaces 22b, 24b act in conjunction with a caliper of the disc brake (not shown) in order to generate a braking torque which is transmitted from the braking band 20 to the hat 40 and from the hat 40 to the wheel hub, to perform the braking of the wheel.

Figure 2:
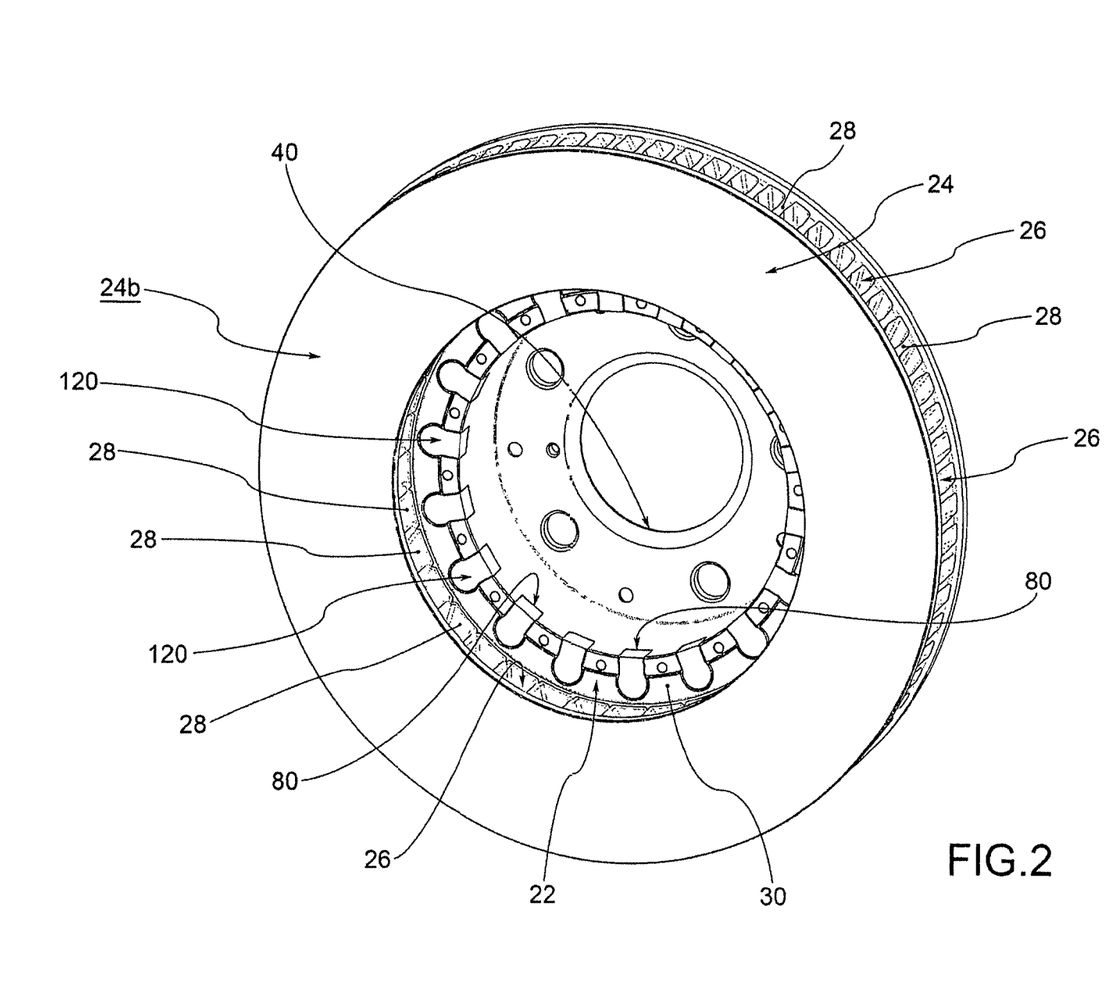
FIG. 2 shows a detail of the connection area between a braking band and a hat of the disc in FIG. 1.

The braking band 20, and in particular the first flange 22 or the second flange 24, is constrained in rotation to the hat 40 by means of a connection system 80.

The connection system 80 comprises a plurality of hat seats 82 formed on the hat wall 42, at the connection end to the band 44.

The hat seats 82 are open radially outwards and preferably also radially inwards and axially.

In other words, the connection end to the band 44 of the hat 40 comprises a plurality of angularly spaced axial protuberances 84, between which the hat seats 82 are defined.

Each hat seat 82 is axially delimited, on the side opposite the opening, by a bottom 86, preferably flat and preferably rectangular in shape, and circumferentially by lateral surfaces 88, 90, also preferably flat, belonging to the respective axial protuberances 84 of the hat 40.

Each axial protuberance 84 of the hat 40 has, on the side facing the outside of the hat 40, a step 92, which forms a support surface 94 for the crown 30 of the band 20.

Correspondingly, the crown 30 of the band 20 comprises a plurality of band seats 100, which succeed each other circumferentially between consecutive radial band projections 102.

Preferably, each band seat 100 is delimited by an arched radial bottom surface 106, for example with a profile defined by an arc of circumference of extension greater than 180°.

Figure 3:
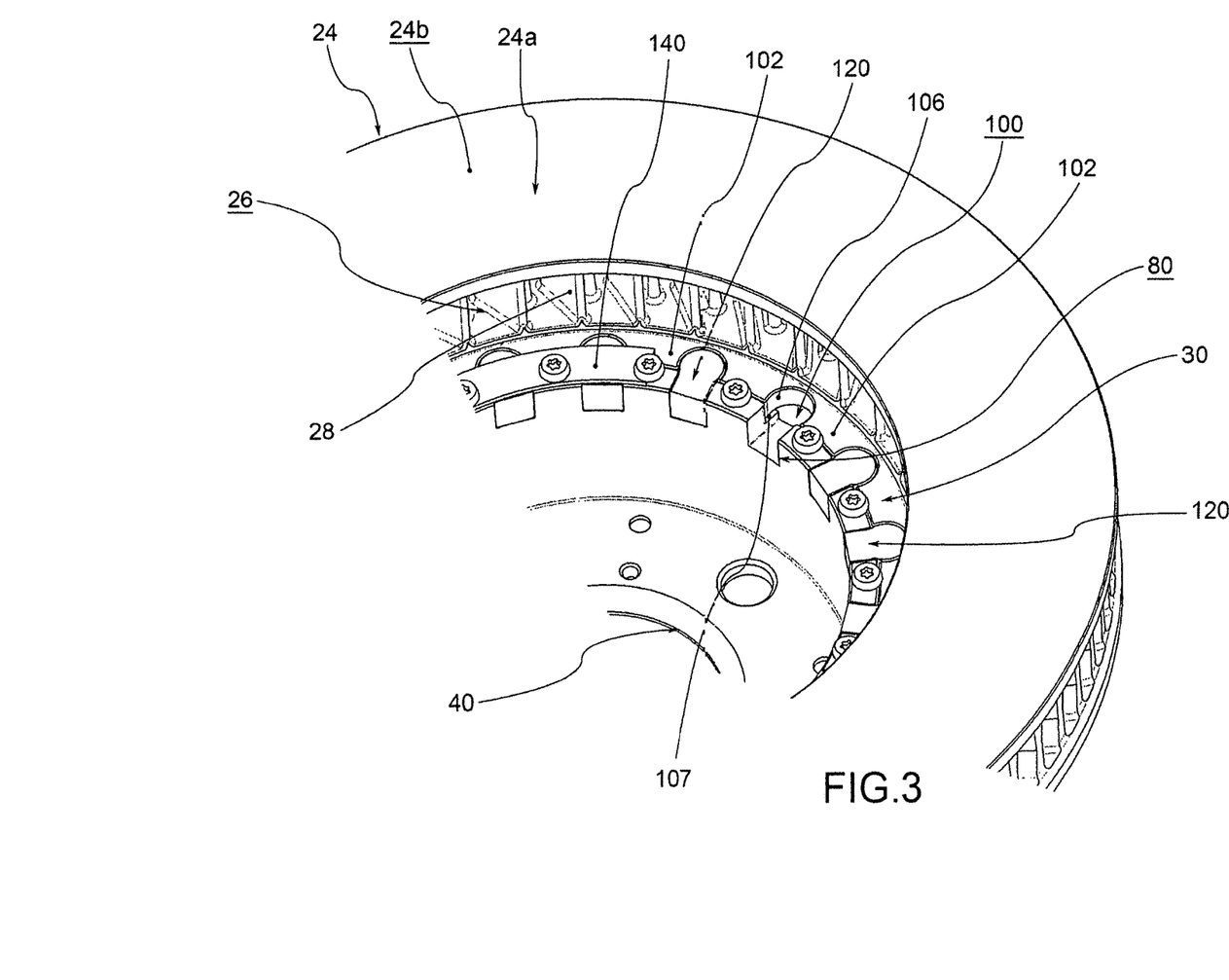
FIG. 3 shows a further detail of the connection area between a braking band and a hat of the disc, in an assembled configuration.

In the assembled configuration of the disc, the crown 30 of the band 20 is placed in axial support on the steps 92 of the hat; in particular, each band projection 102 rests on the respective support surface 94 of the step 92 of the hat 40. This way, each band seat 100 is open radially towards the respective hat seat 82.

Preferably, moreover, the circumferential length of the band projections 102, for example, measured along a median arc of circumference is greater than the corresponding length of the step 92, so that with the crown resting on the hat, a residual portion 107 not covered by the band projections 102 remains on the support surface 94.

In other words, the band projections 102 are circumferentially recessed in relation to the support surface 94 which they rest on.

The connection system 80 further comprises at least one lug 120, preferably a plurality of lugs 120, applicable to the hat 40 and to the band 20, in a releasable manner, so as to constrain them in rotation.

Figures 7, 8, 9:
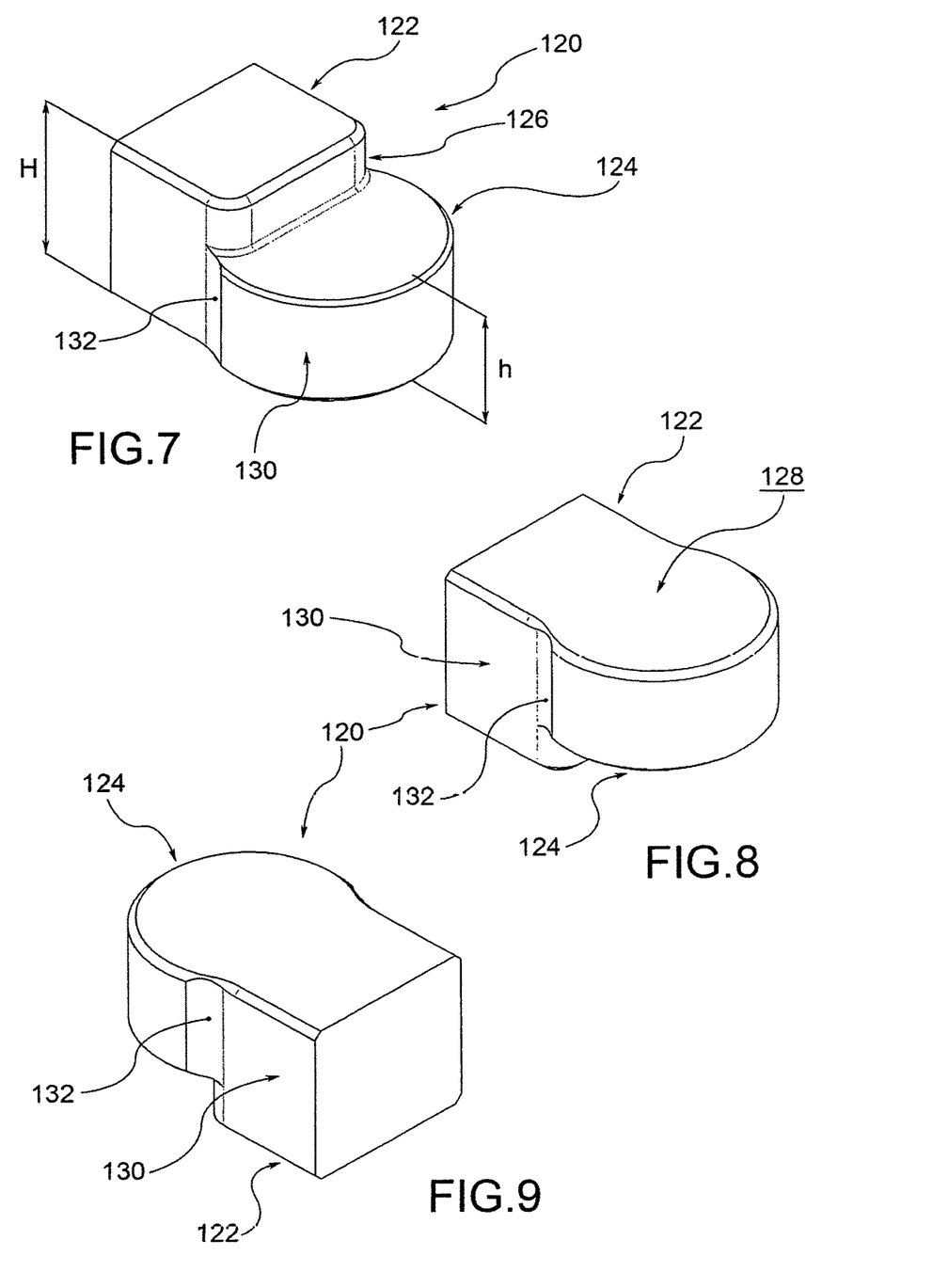
FIGS. 7, 8 and 9 show a lug of the connection system according to an embodiment of the present invention.

The lug 120 comprises a suitably shaped tail 122, which can be inserted, for example axially, in the respective hat seat 82, and a suitably shaped head 124 which can be axially inserted in the band seat 100.

For example, on an imaginary cross-section plane perpendicular to the central axis X, the lug 120 has a tail 122 having a rectangular cross-section, which reproduces the shape and dimensions of the hat seat 82, and a rounded head 124, which reproduces the shape and dimensions of the band seat 100, inserted with minimal clearance in their seats.

Preferably, the hat seat 82 allows the free radial outward translation of the lug 120 in relation to the hat, while the band seat 100 constrains the inward radial translation of the lug 120 in relation to the band 20, so as not to be able to radially escape therefrom.

According to a preferred embodiment, the tail 122 has a height H, i.e. a dimension in the axial direction of the disc, greater than the height h of the head 124, adapting to the relative heights of the hat seat 82 and the band seat 100.

Preferably, moreover, the lug 120, on the coupling side to the band and the hat (FIG. 7), has a lug step 126, between the head 124 and the tail 122.

Preferably, however, the lug 120, on the side opposite the coupling side to the band and the hat (FIGS. 8 and 9), has a single, overall flat surface 128, for the tail 122 and for the head 124.

Moreover, according to a preferred embodiment, the lug 120, along a peripheral surface 130 which delimits it laterally, has at least one undercut 132, i.e. a localised and accentuated recess in relation to the contour of said peripheral surface, at the connection zone between the head 124 and the tail 122.

According to a preferred embodiment, the lug 120, in one piece, for example made by milling from a solid, is in a different material from the band 20 and/or the flanges 22, 24, for example it is made of stainless steel or titanium.

Figure 4:
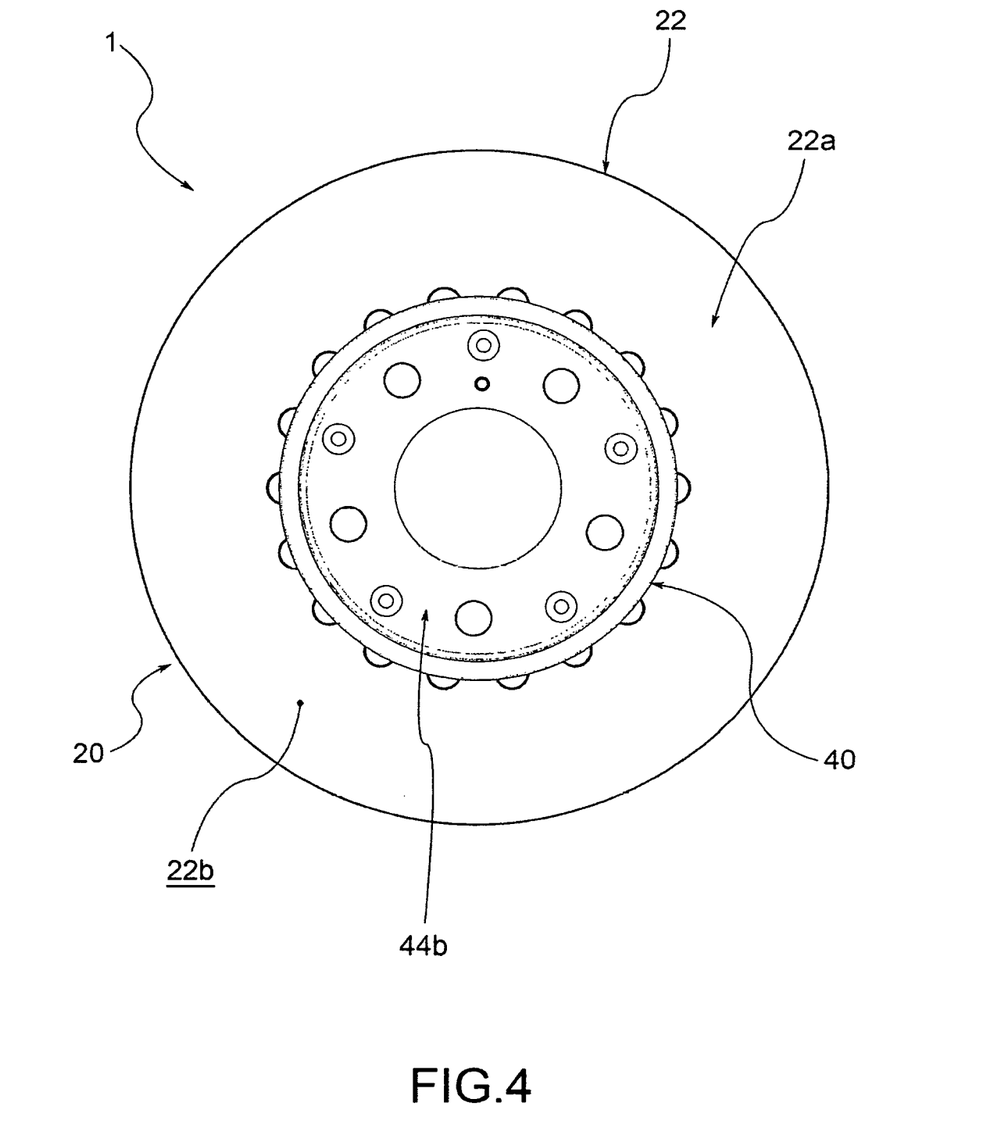
FIG. 4 shows a plan view of the disc in FIG. 1, in an assembled configuration, from a viewpoint on the hat side.
Figure 5:
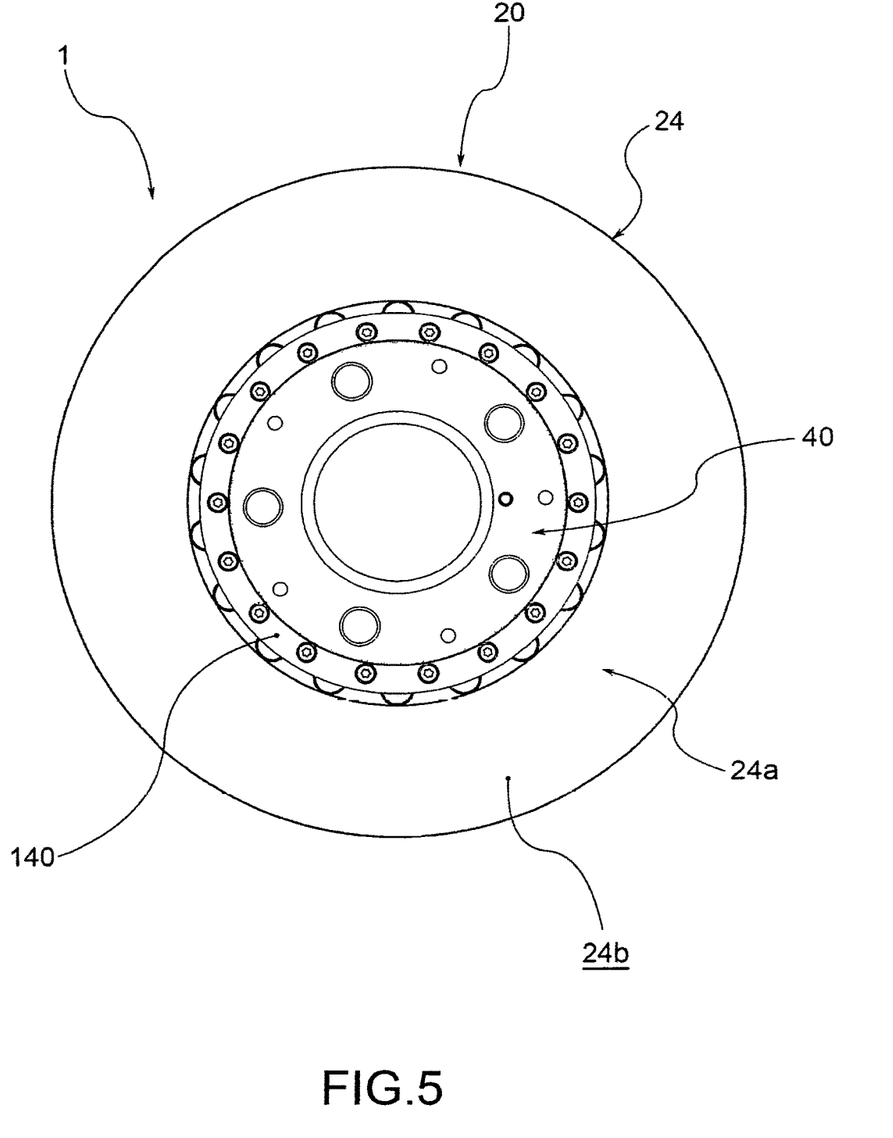
FIG. 5 shows a plan view of the disc in FIG. 1, in an assembled configuration, from a viewpoint opposite the hat side.

Furthermore the connection system 80 comprises at least one stop element 140 applicable to the hat 40 or to the band 20, straddling the hat seats 82 and the band seats 100, to axially retain the lug 120 and determine the floating of the band, i.e. the axial sitting of the connection crown 30.

In particular, the locking ring 140, attached to the hat 40 only or to the band 20 only, surmounts both a portion of the tail 122 of the lug 120 and a portion of the head 124, overlapping the flat surface 128.

For the assembly of the disc, the band 20, and in particular the first flange 22 or the second flange 24, is first axially laid on the hat 40, and in particular the crown 30 is laid on the support surfaces 94 of the steps 92.

Subsequently, the lugs 120 are inserted between the band 20 and the hat 40, to engage them reciprocally in rotation. In particular, the lug 120 is inserted with its tail 122 in the hat seat 82 and with its head 124 in the band seat 100.

Lastly, the stop element 140 is applied to the hat 40 and to the band 20, to axially retain the lug 120, and radially surmounts the connection crown 30 to determine the flotation of the band.

According to a further embodiment (FIG. 10), the disc 1 comprises a nose wheel 160, applicable to the hat 40, for example using the same attachment means used for the attachment of the stop element 140, so that it is pack-closed between said hat 40 and the said stop element 140.

Figure 12:
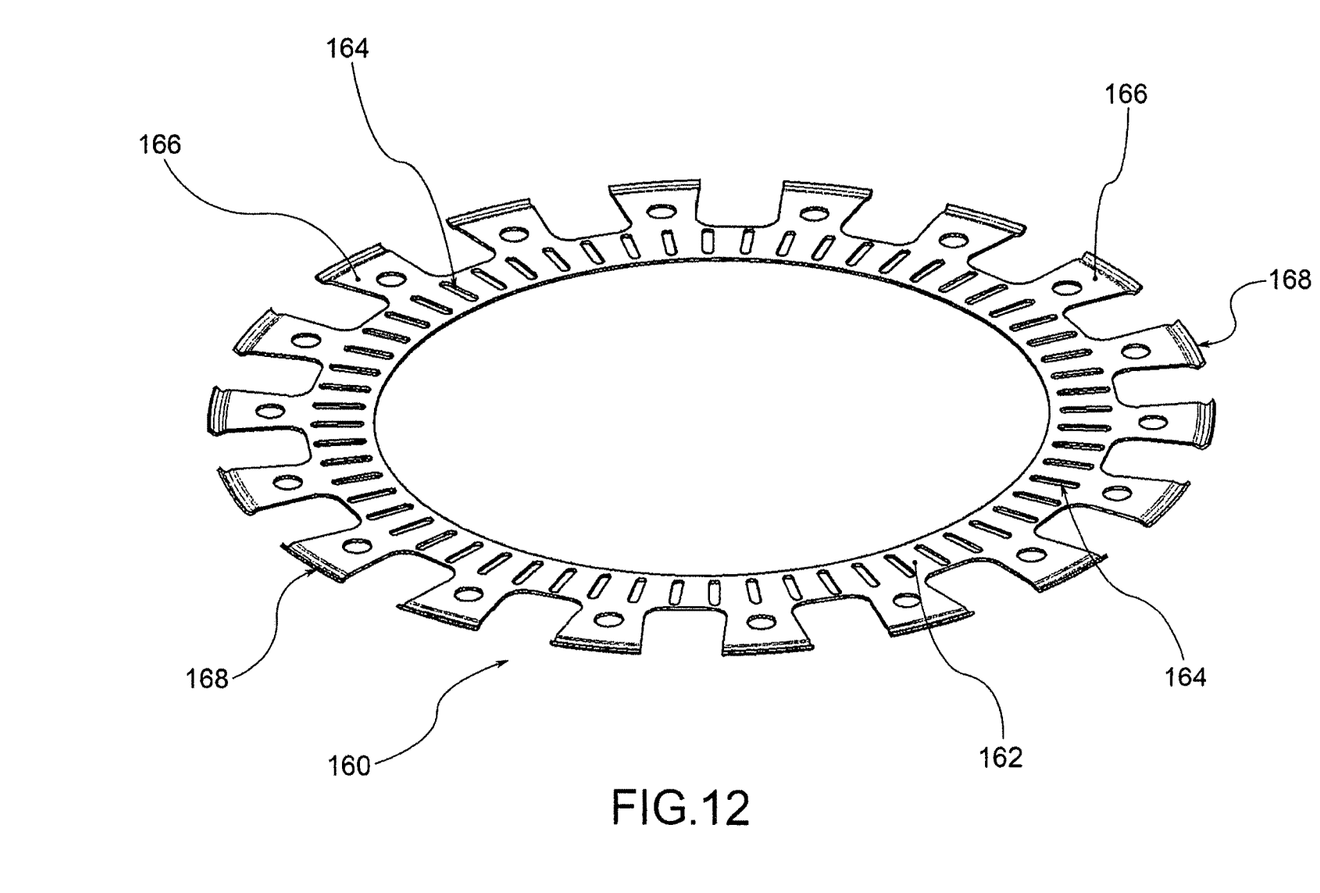
FIG. 12 shows a nose wheel of the disc in FIG. 10.

Preferably, the nose wheel 160 comprises a ring wheel 162, on which signalling elements 164 are present for the functioning of the wheel, and a plurality of fins 166, having a radial extension from the ring wheel 162.

Figure 11:
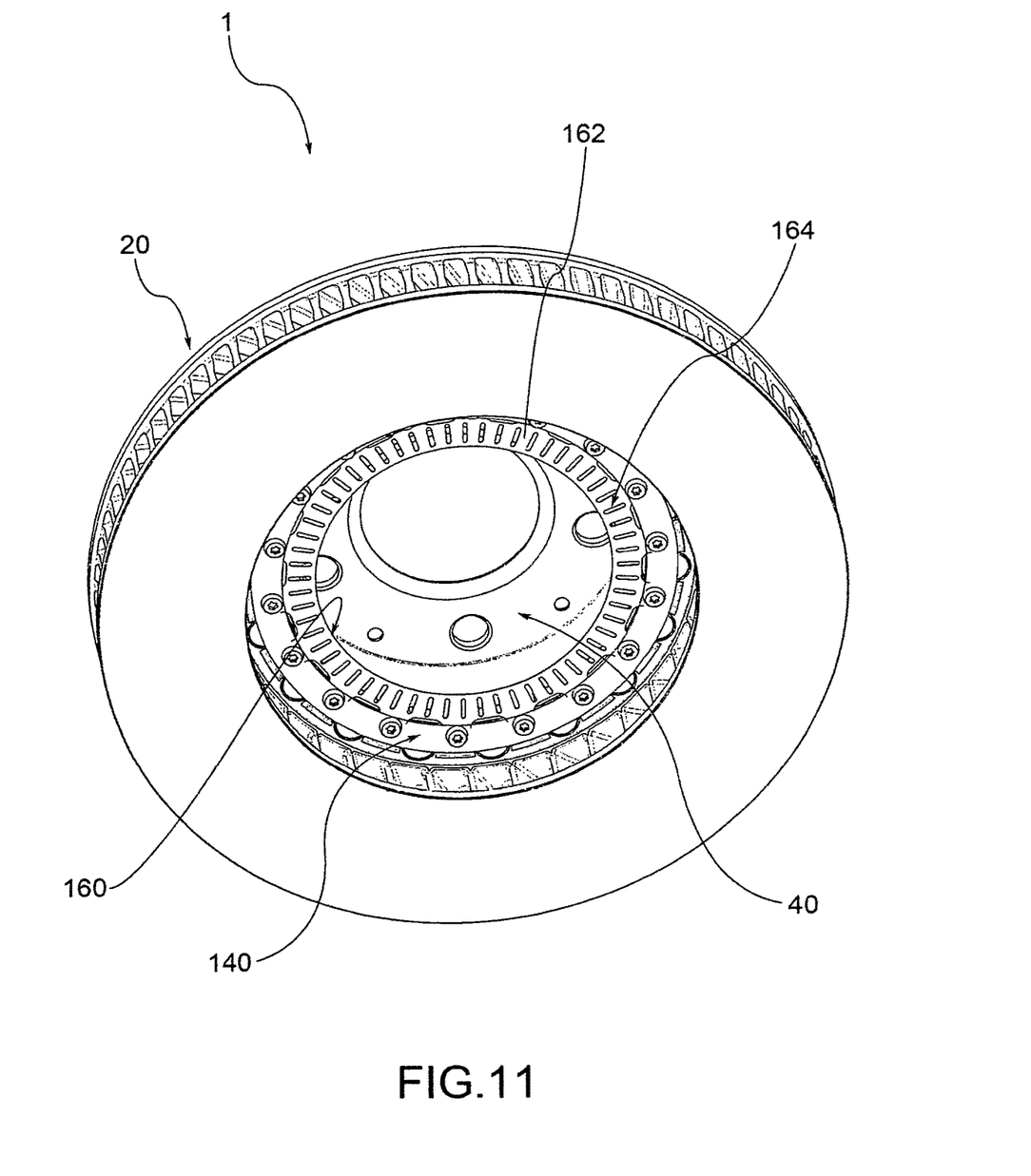
FIG. 11 shows the disc in FIG. 10, in an assembled configuration.

In the assembled configuration, the ring wheel 162 is preferably placed internally, in the radial direction, to the hat seats 82, while the fins 166 overlap the axial protuberances 84 of the hat 40 and extend over the band projections 102 of the band 20.

Preferably, the fins 166 comprise at least one elastic portion 168, for example a bent section, to provide an elastically yielding element in the axial direction in the coupling between the band 20 and the hat 40.

For example, the elastic portion 168 is composed of the radial end portion of said fin 166, and is preferably bent so that it is concave on the side of the stop ring and convex on the band or hat side.

According to a preferred embodiment, the elastic portion 168 is positioned externally, in the radial direction, to the stop element 140, resting on the band projections 102 of the band 20.

Figure 10:
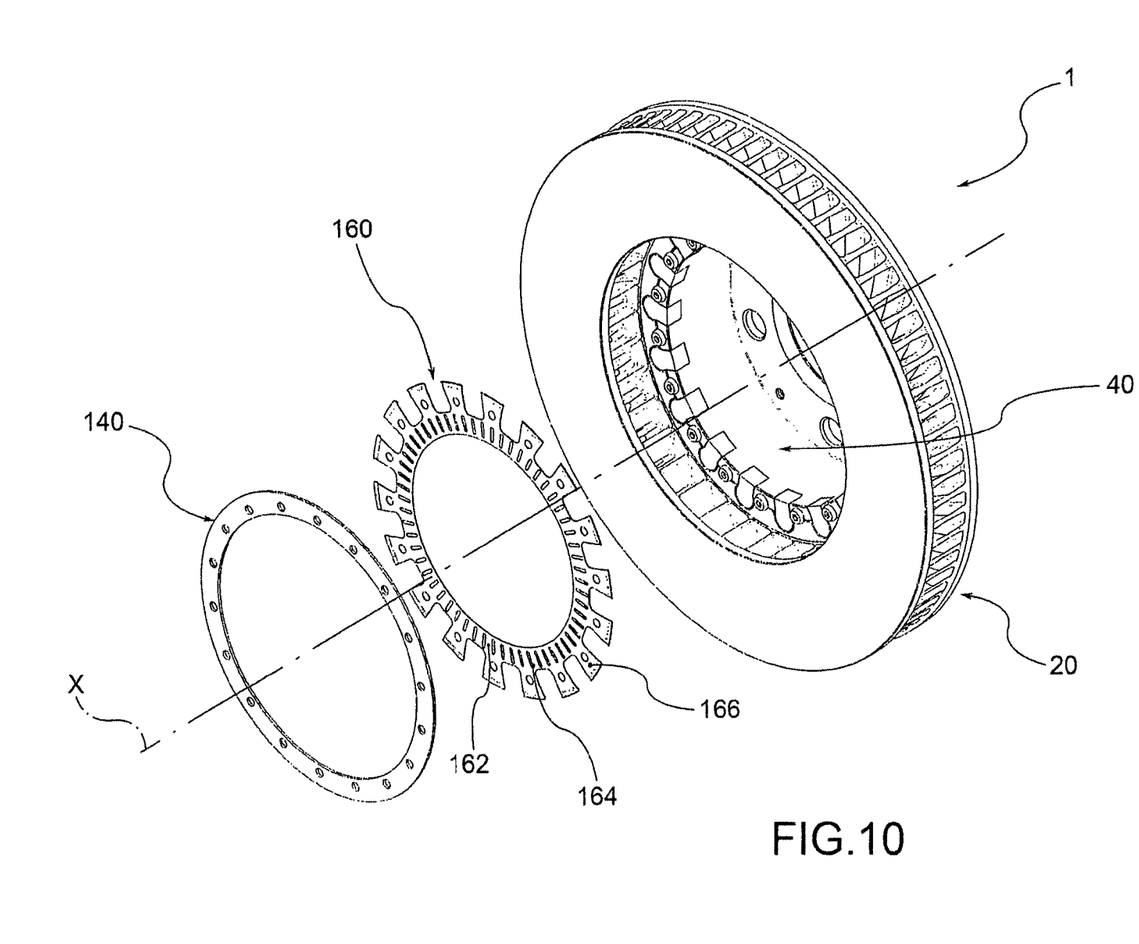
FIG. 10 shows a disc for a disc brake in separate parts, provided with the connection system according to the present invention, according to a further embodiment.

In other words, the nose wheel 160, according to said embodiment incorporates elastic means for the realisation of an elastically yielding coupling in an axial direction between the band and the hat.

Innovatively, the disc for a disc brake according to the present invention overcomes the drawbacks mentioned above with reference to the prior art.

In fact, the lug, being a structurally separate element from the braking band, sits between the band and the hat so as not to generate particularly high localized stresses. Furthermore, the crown portions between the lugs work substantially in a state of compressive stress.

The lug, in addition, is adequately designed to withstand the stresses present on the band and those on the hat, substantially greater than the former.

Advantageously, moreover, the braking band according to the present invention is particularly reliable.

In fact, the arched shape of the head of the lug and of the relative band seat makes it possible to further reduce localized stresses in the crown, improving the reliability of the band, especially in relation to the use of materials subject to crack formation, such as cast iron.

Furthermore, the dilation of the band due to the heating of the component causes a radial pulling of the lug outwards, since the hat seat does not radially constrain the lug tail, whereas the band seat pulls the head radially, keeping it in any case in the correct position.

This prevents the onset of additional stresses due to thermal dilation, since the latter is not countered.

Advantageously, moreover, the connection system according to the present invention also makes it possible to improve braking systems already installed.

In fact, the connection system according to the present invention is applicable to the hats of the prior art, providing lugs having a tail which can be coupled to the hat seats of the prior embodiments.

It is clear that a person skilled in the art may make modifications to the disc described above.

For example, according to an embodiment variant, the disc is of the ventilated type and the braking band thus provides for a single flange, connected to the hat by means of said connection system.

Such variants are also contained within the scope of protection as defined by the following claims.

The invention claimed is:

1. A disc for a disc brake for motor vehicle use, having a central rotation axis, comprising:
    a hat, suitable to be connected to a wheel hub, provided with a plurality of hat seats positioned circumferentially;
    a braking band suitable to be engaged by a caliper of the disc brake to generate a braking torque, provided with a plurality of band seats, each open radially towards the respective hat seat; and
    a connection system comprising at least one lug suitable for inserting in the hat seat and in the respective band seat to rotationally constrain, the band to the hat;
    wherein the connection system comprises at least one stop element applicable to the hat or to the band, straddling the hat seat and the band seat, to axially retain the lug and determine the floating of the band;
    wherein the lug comprises a tail suitable for inserting in the respective hat seat, and a head suitable for inserting in the band seat;
    wherein the band seat prevents the radial translation towards the inside of the lug in relation to the band.

2. The disc according to claim 1, where the band seat is delimited radially by an at least partially arched bottom surface.

3. The disc according to claim 2, wherein the bottom surface has a profile defined by a circular arc of an extension greater than 180°.

4. The disc according to claim 1, wherein the hat seat has, on an imaginary cross-section plane orthogonal to the rotation axis of the disc, a rectangular shape.

5. The disc according to claim 1, wherein the hat comprises a plurality of axial protuberances between which said hat seats are defined, and wherein at least one of said axial protuberances has a step which forms a support surface on the side facing the outside of the hat, to define an axial support for the band.

6. The disc according to claim 5, wherein the band comprises a plurality of radial band projections, between which said band seats are defined, and wherein said band projections are axially supported on the support surfaces of the hat.

7. The disc according to claim 6, wherein the band projection is circumferentially recessed in relation to the support surface which it rests on.

8. The disc according to claim 1, wherein the tail is suitable for inserting axially in the hat seat and the head is suitable for inserting axially in the band seat.

9. The disc according to claim 1, wherein the head of the lug is rounded.

10. The disc according to claim 1, wherein the hat seat allows the radial translation towards the outside of the lug in relation to the hat.

11. The disc according to claim 1, wherein the tail of the lug has a greater height than the height of the head.

12. The disc according to claim 1, wherein the lug is in one piece and constructed of metal selected from the group consisting of stainless steel and titanium.

13. The disc according to claim 1, wherein the band comprises at least one flange comprising a ring bearing a braking surface.

14. The disc according to claim 13, wherein the flange is made of cast iron, selected from the group consisting of spheroidal and flake iron, or carbon ceramic material.

15. The disc according to claim 13, wherein the disc is of the ventilated type, wherein a single flange is engaged with the hat by means of the connection system, said flange being provided with said band seats.

16. The disc according to claim 1, comprising a nose wheel which integrates elastic means for the realisation of an elastically yielding coupling in an axial direction between the band and the hat.

17. An assembly kit of a disc for a disc brake, comprising:
    a braking band destined to be engaged by a caliper of the disc brake to generate a braking torque, provided with a plurality of band seats;
    a plurality of lugs suitable for inserting in the band seat to constrain the band in rotation with a hat of the disc brake; and
    at least one stop element applicable to the hat or to the band seat, straddling a hat seat and the band seat, to axially retain at least a lug of the plurality of lugs and determine the floating of the band seat;
    wherein each band seat is open radially towards a respective hat seat;
    wherein the luq comprises a tail suitable for inserting in the respective hat seat, and a head suitable for inserting in the band seat;
    wherein the band seat prevents the radial translation towards the inside of the lug in relation to the band.

* * * * *